US012416709B2

(12) United States Patent
Kim et al.

(10) Patent No.: US 12,416,709 B2
(45) Date of Patent: Sep. 16, 2025

(54) METHOD AND APPARATUS FOR REMOVING LiDAR POINT CLOUD NOISE

(71) Applicants: Korea Advanced Institute of Science and Technology, Daejeon (KR); Yeungnam University, Gyeongsan-si (KR)

(72) Inventors: Kyung Soo Kim, Daejeon (KR); Ji-Ii Park, Daejeon (KR); Min Seong Choi, Daejeon (KR); Hyun Yong Jeon, Daejeon (KR); Ji Hyuk Park, Gyeongsan-si (KR)

(73) Assignees: KOREA ADVANCED INSTITUTE OF SCIENCE AND TECHNOLOGY, Daejeon (KR); YEUNGNAM UNIVERSITY, Gyeongsan-si (KR)

( * ) Notice: Subject to any disclaimer, the term of this patent is extended or adjusted under 35 U.S.C. 154(b) by 1024 days.

(21) Appl. No.: 17/486,923

(22) Filed: Sep. 28, 2021

(65) Prior Publication Data
US 2022/0214427 A1    Jul. 7, 2022

(30) Foreign Application Priority Data

Jan. 6, 2021   (KR) .................. 10-2021-0001372
Jun. 3, 2021   (KR) .................. 10-2021-0071925

(51) Int. Cl.
*G01S 17/89* (2020.01)
*G01S 7/48* (2006.01)

(52) U.S. Cl.
CPC ............. *G01S 7/48* (2013.01); *G01S 17/89* (2013.01)

(58) Field of Classification Search
CPC ........ G01S 7/48; G01S 7/52077; G01S 17/89; G01S 17/894
USPC ...................................................... 382/275
See application file for complete search history.

(56) References Cited

U.S. PATENT DOCUMENTS

| 2020/0379096 A1* | 12/2020 | Zhou ............... G01N 21/55 |
| 2021/0188312 A1* | 6/2021 | Shikari ............ G01C 21/3453 |
| 2021/0216814 A1* | 7/2021 | Li .................. G06V 10/763 |
| 2021/0224613 A1* | 7/2021 | Guo ................ G06V 10/40 |

\* cited by examiner

*Primary Examiner* — Jamares Q Washington
(74) *Attorney, Agent, or Firm* — LEX IP MEISTER, PLLC

(57) ABSTRACT

Disclosed is a method and apparatus for removing LiDAR point cloud noise. This method removes in real time only the LiDAR point cloud noise acquired in snowfall and rain environments, leaving behind the environmental characteristics of the LiDAR point cloud. Accordingly, it is possible to maximize the utilization of the LiDAR.

9 Claims, 10 Drawing Sheets

```
1:  for p ∈ P do
2:      computer the distance of the point d_p
            // Determine the intensity threshold
3:      if d_p <  Noise detection range then
4:          I_thr ← Intensity threshold curve
5:      else
6:          I_thr ← 0 (∵ No-noise area )
7:      end if
            // Step 1 : remove the noise points
8:      if I_p > I_thr then
9:          point p classified as inlier p_in
10:     else
11:         point p classified as outlier p_out
            // Step 2 : apply the RIS filter
12:         count the number of neighbors n_p
13:         if n_p > n_thr then
14:             outlier p_out reclassified as inlier p_in
15:         end if
16:     end if
17: end for
```

METHOD AND APPARATUS FOR REMOVING LiDAR POINT CLOUD NOISE

BACKGROUND OF THE INVENTION

1. Field of the Invention

The present invention relates to LiDAR point cloud noise removal, and more specifically, a method and apparatus for removing only LiDAR point cloud noise acquired in snowfall and rain environments in real time, leaving the LiDAR point cloud of environmental characteristics, maximizing the utilization of LiDAR.

2. Description of the Related Art

In general, LiDAR can acquire a point cloud according to accurate distance information compared to a camera. And since it shows the same performance as in the daytime even at night, it can be used as an essential sensor. For example, when LiDAR is used for autonomous driving, there is little error in measuring the distance to surrounding objects, and it has the advantage of being able to sense both day and night. In particular, unlike highway driving, it is argued that LiDAR is essential for city driving.

LiDAR sensors also have disadvantages. The first is that they are larger and more expensive than other sensors. However, these disadvantages are being gradually overcome as the size of the currently developed LiDAR sensor is getting smaller and the price is lowered. The second disadvantage is that it is vulnerable to environmental changes such as snow, rain, and fog. In particular, in the case of LiDAR point clouds acquired in snowy or rainy environments, there is a problem in that object recognition and classification through point clustering becomes difficult due to noise caused by snow or rain.

In Patent Document 1, points satisfying all three (3) simple filtering conditions are identified as noise and removed. In the first condition, it is determined whether there are points within the reference distance, and in the second condition and the third condition, it is determined whether the number of points existing within the adjacent measurement angle based on the reference point P(n,m) is 1 or less and removed. In snow or rain, these three (3) simple conditions were presented based on the assumption that there are 1 or 2 adjacent LiDAR points on the top/bottom, left/right. Although it has the advantage of being able to quickly remove snow/rain noise based on a simple threshold standard, it has a filtering effect that is vulnerable to large-sized rain or snow (e.g., large snowflakes, 2-3 snow crystals), and there is a disadvantage in that precise data analysis and countermeasures for size are insufficient.

In Patent Document 2, when the intensity of the received laser reflection signal is smaller than the reference intensity, the LiDAR determines that there is no meaningful object, so that the maximum measurement distance is affected by the climate. Here, the climatic environment is determined by calculating the distance to the object, and the signal strength of the laser transmission signal is adjusted by calculating an attenuation coefficient according to the result. Although it has the advantage of extending the maximum measurement distance of LiDAR, it has the disadvantage that there is no noise (snow, rain, dust, etc.) removal algorithm, and additional power consumption occurs due to the increase in the signal strength of the hardware.

In addition, Patent Document 3 is an autonomous driving system that can obtain a 2D image and a 3D point cloud map. By performing semantic segmentation on the acquired image, the recognized object is classified by pixel color, image pixels are clustered, and 3D points are projected on the map generated by SLAM to compare, judge, and remove noise. However, it is difficult to guarantee real time because additional cameras and SLAM systems are essential in addition to LiDAR, and each 3D point must be collated after SLAM is performed. In the case of an autonomous driving system in which LiDAR and camera are used together, real-time is the key, so this is a problem. It is more efficient to do fusion with the camera after removing the filter from the LiDAR.

Autonomous driving, a typical field where LiDAR is applied, is capable of driving a vehicle automatically without human operation, and a car drives autonomously just by designating a destination by recognizing the surrounding environment with radar, LiDAR, GPS, and camera. Currently, autonomous driving research is progressing at the level of an ideal environment in clear weather, but in the future, autonomous driving technology must be implemented in extreme environments such as snow or rain or at night. For this reason, studies to realize autonomous driving in such extreme environments are being conducted in Northern Europe and North America, where a lot of snow or rain is falling. Safe and reliable autonomous driving can only be realized by combining a radar sensor that is strong in long-distance object identification and environmental changes, a LiDAR that is strong in accurate identification of small objects and nighttime situations, and a camera that is strong in accurate object recognition and color information acquisition through high resolution. Currently, some autonomous driving companies such as Tesla are implementing autonomous driving except for LiDAR, but accidents between pedestrians or vehicles that are difficult to identify at night often occur. And most companies such as Google's Waymo, Uber, and Ford are all applying LiDAR, but they are vulnerable to environmental changes such as snow, rain and fog. If the above problems are solved, LiDAR will be recognized as a perfect sensor, and it is predicted that LiDAR will secure the initiative in the autonomous driving sensor that the camera currently has.

Furthermore, it would be desirable if it could respond to environmental changes such as snow, rain, and fog, which are weak points of LiDAR, in various fields to which LiDAR is applied, for example, surveillance and aerial surveying.

PRIOR ARTS

[Patent Document 1] US1020160103208 A
[Patent Document 2] KR1020170106742 A
[Patent Document 3] KR1020190287254 A

SUMMARY OF THE INVENTION

The present invention, as invented to solve such a problem, provides a method and apparatus for removing LiDAR point cloud noise that removes LiDAR point cloud noise acquired in snowfall and rainfall environments in real time while leaving the environmental characteristics of the LiDAR cloud point in order to maximize the utilization of LiDAR.

According to an aspect of the present invention, there is provided a method for removing LiDAR point cloud noise, comprising the steps of: (a) checking whether a distance of a LiDAR point is within a noise detection distance; (b) if the distance of the LiDAR point is within the noise detection distance in step (a), checking whether an intensity measurement value of the LiDAR point is less than a noise intensity threshold; (c) if there is a specific LiDAR point whose intensity measurement value is less than the noise intensity threshold in step (b), checking whether a number of neighboring LiDAR points within an arbitrary radius of the specific LiDAR point is greater than or equal to a certain threshold value; and (d) if the number of neighboring LiDAR points within the arbitrary radius of the specific LiDAR point is not greater than or equal to the certain threshold value in step (c), determining the specific LiDAR point as noise to be removed.

According to other aspect of the present invention, there is provided an apparatus for removing LiDAR point cloud noise, comprising: at least one processor; and, at least one memory storing computer-executable instructions, wherein the computer-executable instructions stored in said at least one memory, when executed by the at least one processor, causes the at least one processor to perform operations comprising the steps of: (a) checking whether a distance of a LiDAR point is within a noise detection distance; (b) if the distance of the LiDAR point is within the noise detection distance in step (a), checking whether an intensity measurement value of the LiDAR point is less than a noise intensity threshold; (c) if there is a specific LiDAR point whose intensity measurement value is less than the noise intensity threshold in step (b), checking whether a number of neighboring LiDAR points within an arbitrary radius of the specific LiDAR point is greater than or equal to a certain threshold value; and (d) if the number of neighboring LiDAR points within the arbitrary radius of the specific LiDAR point is not greater than or equal to the certain threshold value in step (c), determining the specific LiDAR point as noise to be removed.

According to the present invention, since it is possible to select and remove only noise points which is not important environmental information, there is an effect of not only accurate noise removal but also noise removal speed improvement.

DETAILED DESCRIPTION OF THE INVENTION

Hereinafter, exemplary embodiments of the present invention will be described in detail with reference to the accompanying drawings. The same or similar components are assigned the same or similar reference numerals, and redundant descriptions thereof will be omitted. In describing the embodiments disclosed in the present specification, when it is considered that a detailed description of related known technologies may obscure the subject matter of the embodiments of the present specification, the detailed description thereof will be omitted. The accompanying drawings are only for making it easier to understand the embodiments disclosed in the present specification, and the technical idea disclosed in the present specification is not limited by the accompanying drawings. It is to be understood as including all changes, equivalents, or substitutions included in the spirit and scope of the present invention.

Terms including ordinal numbers, such as first and second, can be used to describe various components, but these terms are used only for the purpose of distinguishing one component from another, and the corresponding components are not limited by these terms. Singular expressions include plural expressions, unless the context clearly indicates otherwise.

As used herein, terms such as "comprises", "includes" or "have" should be understood as limiting the existence of features, steps, elements, or combinations thereof described in the specification and it is not intended to exclude the possibility of the presence or addition of one or more features, steps, components, or combinations thereof.

Figure 1:
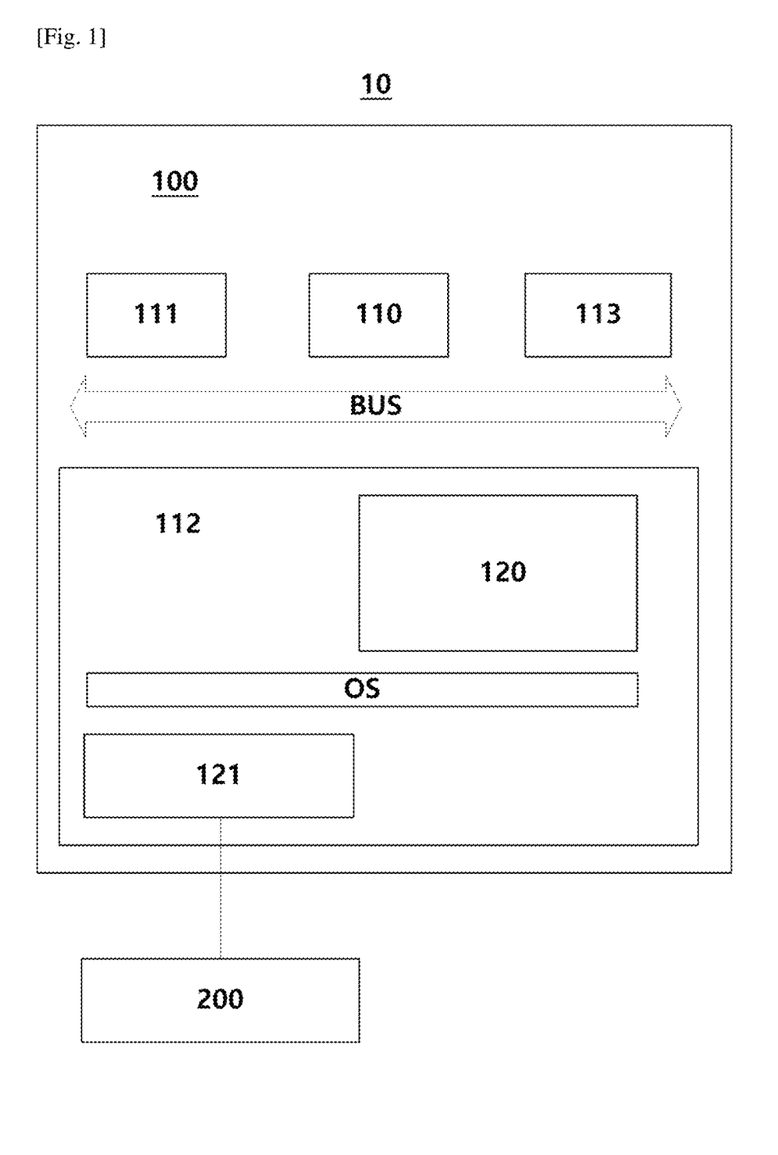
FIG. 1 is a diagram showing the configuration of a computer device equipped with a LiDAR LiDAR point cloud noise removal application according to the present invention.

FIG. 1 is a diagram showing the configuration of a computer device equipped with a LiDAR LiDAR point cloud noise removal application according to the present invention.

The LiDAR point cloud noise removal apparatus 100 includes a processor 110, a non-volatile storage unit 111 for storing programs and data, a volatile memory 112 for storing programs being executed, and for communicating with other devices. It consists of a communication part 113, a bus, etc. which are internal communication paths between these devices. The running program may include a device driver, an operating system, and various applications. Although not shown, the electronic device includes a power supply unit such as a battery.

The LiDAR point cloud noise removal system 10 refers to a structure in which the LiDAR sensor 200 is further included in the LiDAR point cloud noise removal apparatus 100.

In the LiDAR point cloud noise removal system 10, the LiDAR sensor 200 emits a specific signal (beam) toward an object, and receives a signal (wavelength and intensity) reflected with respect to the emitted specific signal. Then, the reflected signal received by the LiDAR sensor 200 is transferred to the LiDAR point cloud noise removal application 120. In this way, the LiDAR point cloud noise removal application 120 receives the wavelength and intensity of the LiDAR signal reflected from the object. When the LiDAR sensor 200 continuously transmits the reflected signal, the LiDAR point cloud noise removal apparatus 100 receives it from a data interface device, etc. (not shown), and transmits it to the LiDAR point cloud noise removal application 120 appropriately. That is, the data interface device may serve as a kind of buffer in the process of transferring the reflected signal to the LiDAR point cloud noise removal application 120. In addition, the LiDAR sensor driver 121 may be installed in the LiDAR point cloud noise removal apparatus 100 to control the operation of the LiDAR sensor 200 as described above.

The LiDAR point cloud noise removal application 120 removes noise such as snowfall and rainfall climatic environment by using the wavelength and intensity of the LiDAR signal (i.e., a laser beam reflected from an object). Such LiDAR point cloud noise removal application 120 is a program installed and operated in the LiDAR point cloud noise removal apparatus 100 using a LiDAR signal. A method of removing noise by executing the LiDAR point cloud noise removal application 120 will be described hereinafter with reference to FIGS. 3 to 8.

Figure 2:
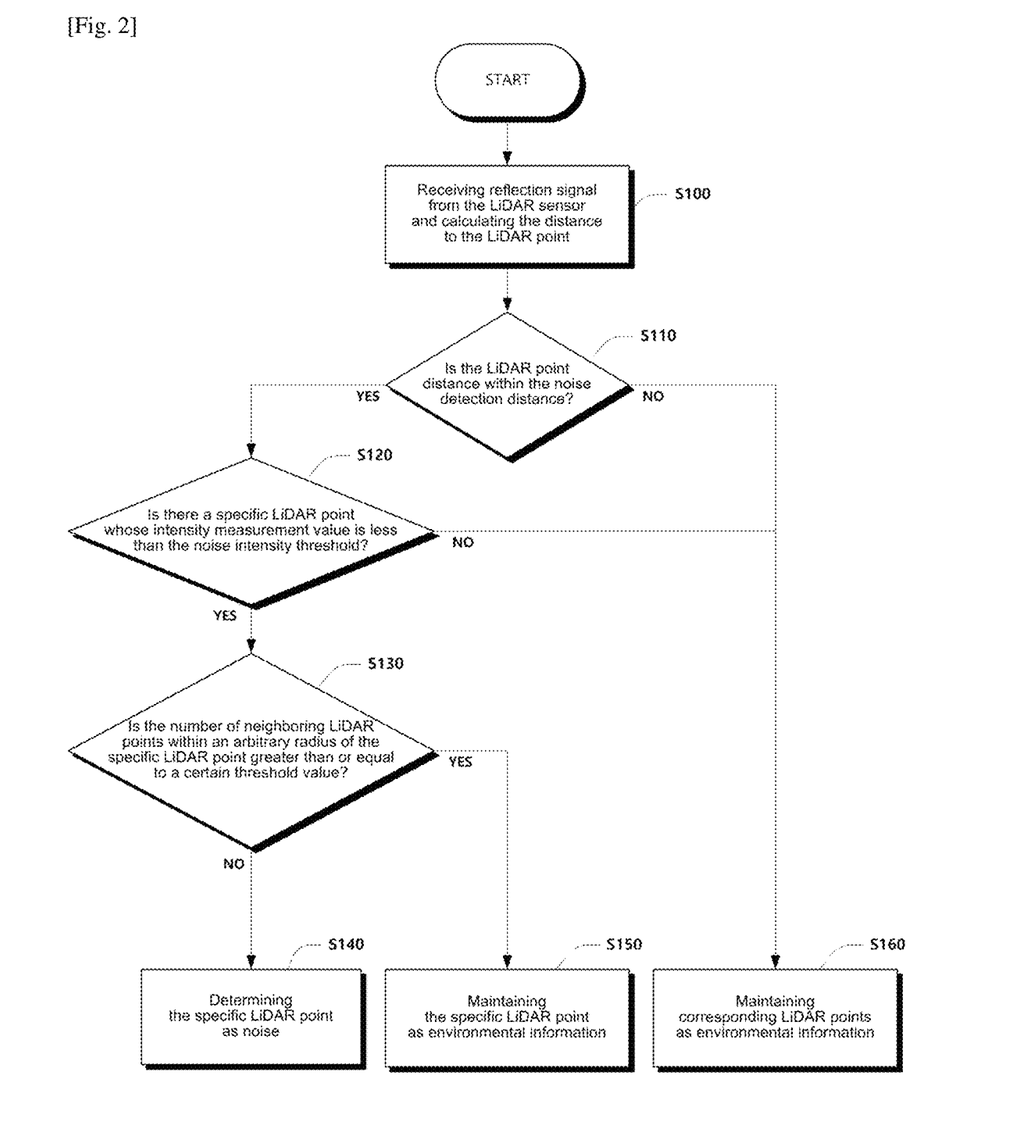
FIG. 2 is a view showing a LiDAR point cloud image photograph obtained on a snowy day to help understand the LiDAR point cloud noise removal method according to the present invention.

FIG. 2 is a diagram illustrating a photo of a LiDAR point cloud image acquired on a snowy day to help understand the LiDAR point cloud noise removal method according to the present invention.

Referring to FIG. 2, when examining the intensity value of the LiDAR point cloud acquired on a snowy day, it shows that the intensity difference between the snow and the object is clearly revealed. Therefore, the attention was paid to the fact that the noise intensity value of the LiDAR point cloud is significantly lower than that of the surrounding point cloud, and it can be obtained as a noise intensity threshold that is a standard for removing snow, rain, and fog.

Figure 3:
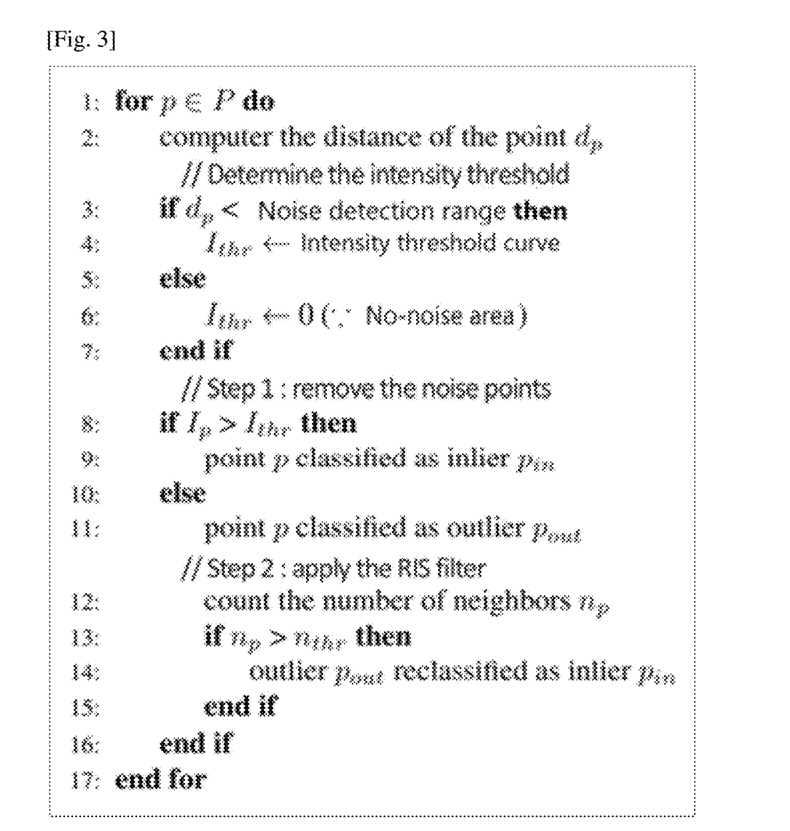
FIG. 3 is a pseudocode illustrating a method for removing noise from a LiDAR point cloud according to the present invention.
Figure 4:
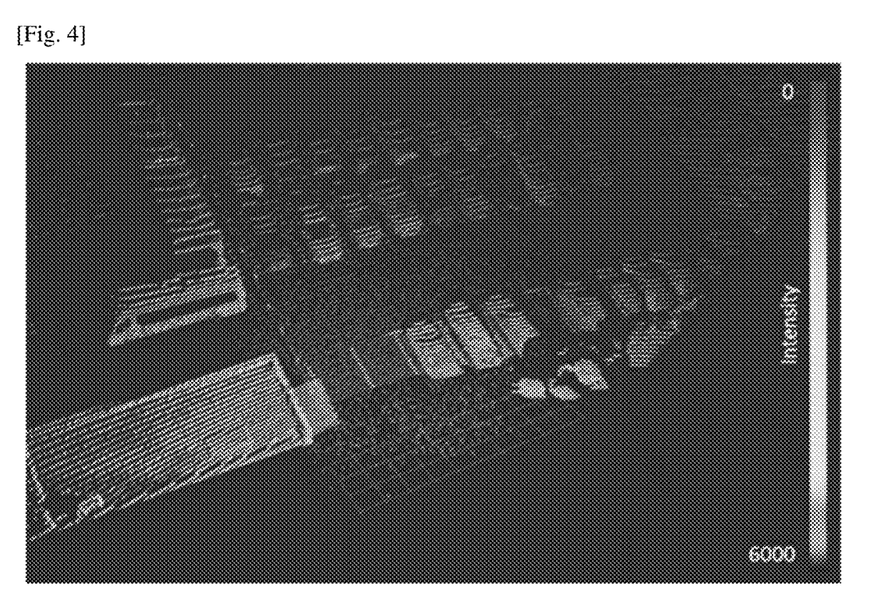
FIG. 4 is a diagram illustrating an algorithm of a method for removing noise from a LiDAR point cloud according to FIG. 3.

FIG. 3 is a pseudocode illustrating a method for removing noise from a LiDAR point cloud according to the present invention, and FIG. 4 is a diagram illustrating an algorithm of the method for removing noise from a LiDAR point cloud of FIG. 3.

FIG. 3 shows a process performed by the operation of the LiDAR point cloud noise removal application 120 of FIG. 1, and FIG. 4 will be referred to for better understanding.

First, a reflection signal is received from the LiDAR sensor, and the distance ($d_p$) to the LiDAR point of all objects is calculated (S100).

Thereafter, it is checked whether the LiDAR point distance $d_p$ is within a noise detection distance (S110). In this embodiment, the noise detection distance is 71.235 m, but is not limited thereto and this may vary depending on the type of LiDAR sensor.

As a result of checking in step S110, if the distance $d_p$ of the LiDAR point is within the noise detection distance, it is checked whether there is a specific LiDAR point in which the intensity measurement value $I_p$ is less than the noise intensity threshold $I_{thr}$ (S120). As a result of checking in step S120, the specific LiDAR point, if any, in which the intensity measurement value $I_p$ is less than the noise intensity threshold $I_{thr}$ may be primarily classified as noise before the next step S130 is operated. And the noise intensity threshold can be described through the noise intensity curve shown in FIG. 5.

Figure 5:
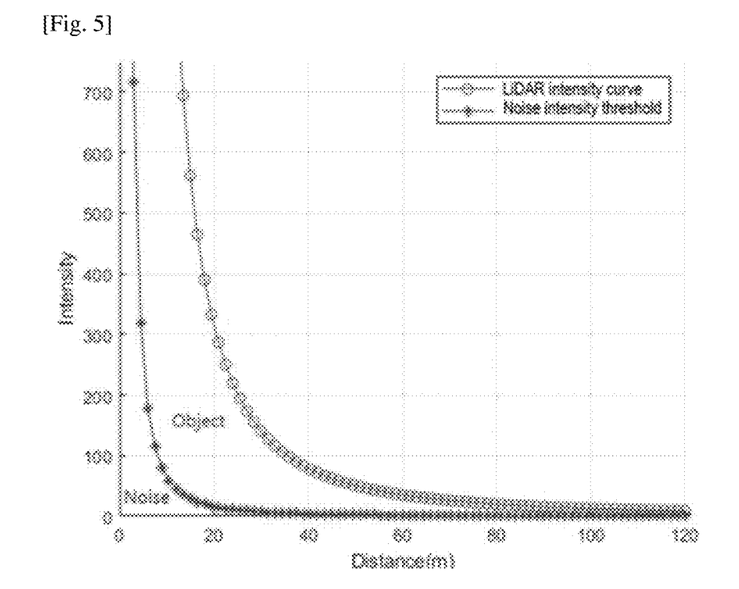
FIG. 5 is a graph showing a noise intensity curve serving as a noise removal standard according to FIG. 3.

Referring to FIG. 5, the circled curve is the LiDAR intensity curve, the asterisk curve is the noise intensity threshold curve. The asterisk curve, which is the threshold for noise removal (classification), was derived from the reflectance and incident angle of noise, and the area ratio between the footprint size of the LiDAR beam and the noise size. Here, 45 degree was applied when the reflectance was assumed to be a sphere, and the area ratio was calculated after changing the beam spread of LiDAR from angle (degree) to millirad (mrad). The circled LiDAR intensity curve is shown as a result that is inversely proportional to the square of the distance according to the inverse square law. At this time, the points between the circled curve indicating the maximum intensity value of the LiDAR and the asterisk curve serving as the noise removal threshold mean the object points from which the noise has been removed, and are primarily classified as noise in step S120.

Subsequently, as a result of step S120, if there is a specific LiDAR point in which the intensity measurement value $I_p$ is less than the noise intensity threshold $I_{thr}$, it is checked whether the number of neighboring LiDAR points ($n_p$) within an arbitrary radius of the specific LiDAR point that is primarily classified as noise is greater than or equal to a certain threshold value ($n_{thr}$) (S130). In this embodiment, the arbitrary radius is 0.1 m, and the threshold value is 3 pts, but is not limited thereto and may vary depending on the type of LiDAR sensor.

Here, step S130 is to reclassify the specific LiDAR point classified as noise in step S120 as important environmental information, and a description thereof will be described with reference to FIGS. 6 to 7.

Figure 6:
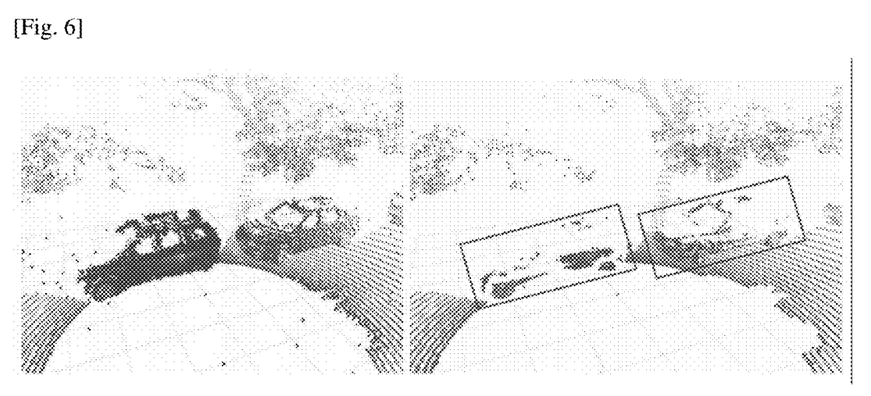
FIG. 6 is a view showing a photo depicting a LiDAR point cloud when noise is removed by applying the noise intensity curve according to FIG. 5.
Figure 7A:
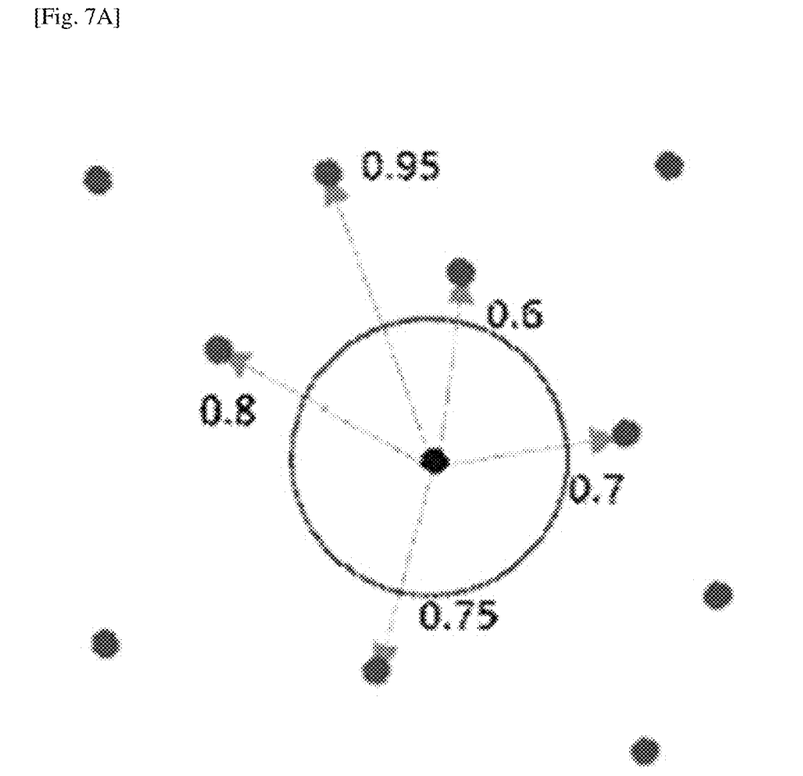
FIGS. 7A and 7B are views showing a principle of maintaining a specific LiDAR point according to FIG. 3 as environmental information; and, FIG. 8A to 8D are views showing noise removal results to which the LiDAR point removal method according to the present invention is applied.
Figure 7B:
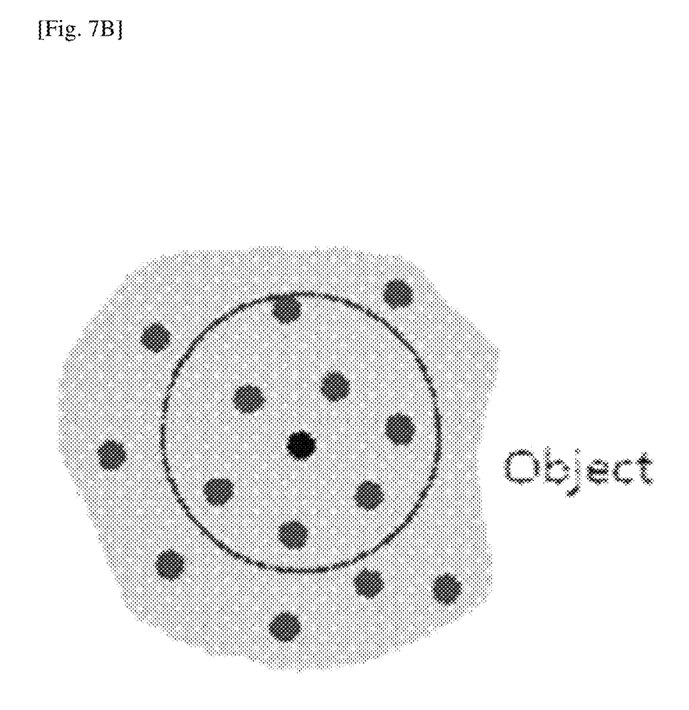
Figure 8A:
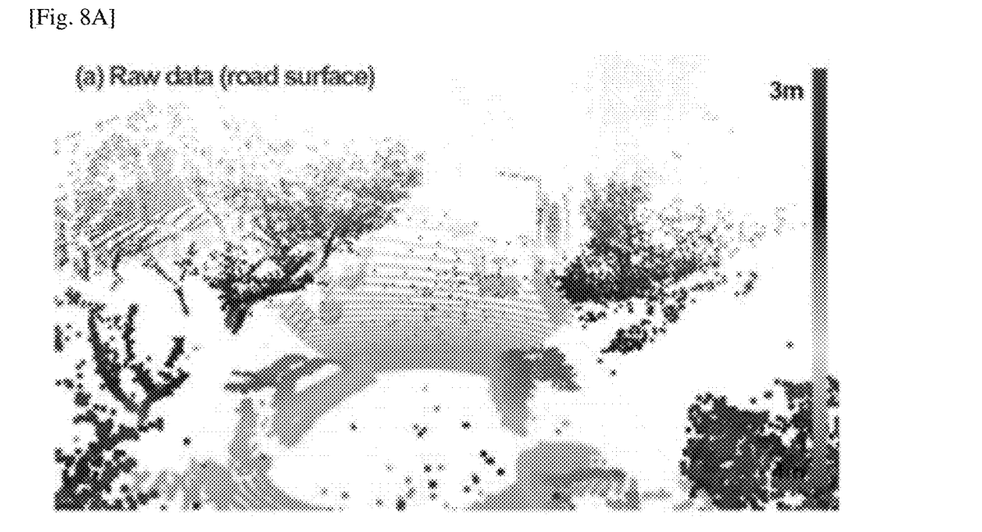
Figure 8B:
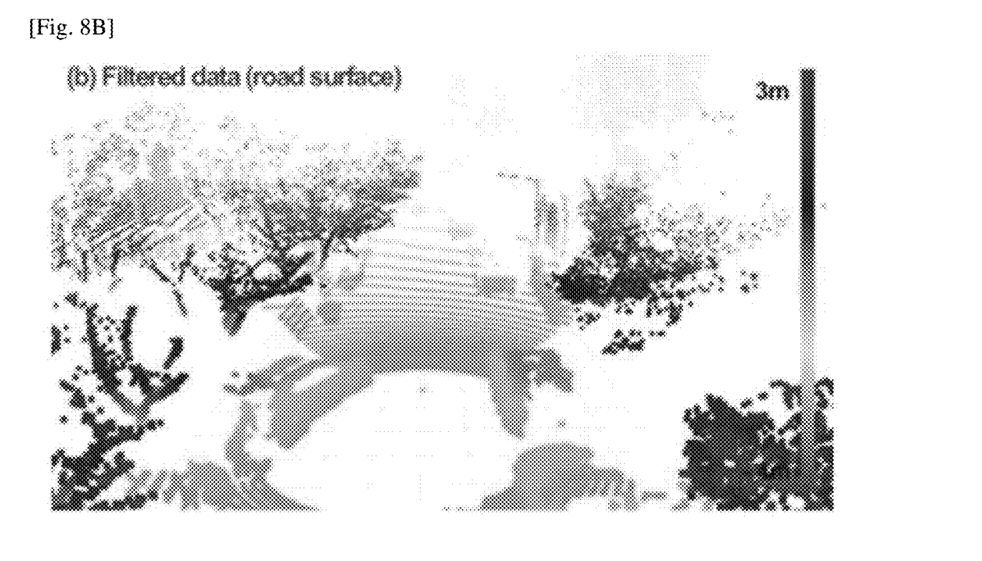
Figure 8C:
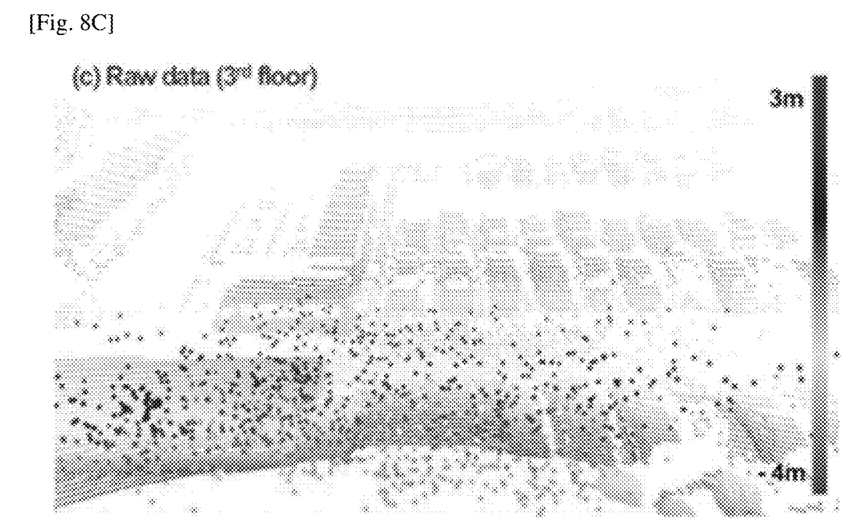
Figure 8D:
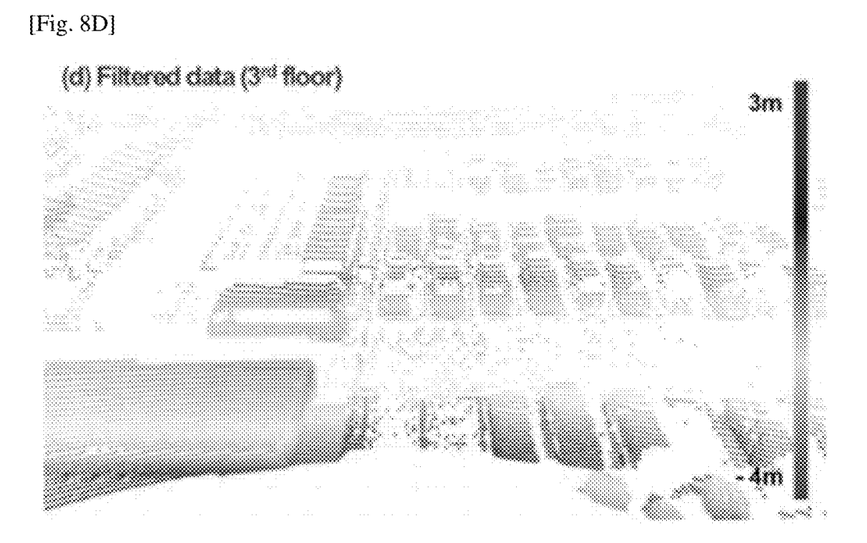

FIG. 6 is a photograph showing a LiDAR point cloud when noise is removed by applying the noise intensity curve according to FIG. 5, and FIG. 7 is a picture showing the principle of reclassifying or maintaining a specific LiDAR point as environmental information.

Referring to FIG. 6, when noise is removed by applying the noise intensity curve of FIG. 5, the intensity value is measured to be low due to the low reflectance of the vehicle surface and the high incident angle of the LiDAR beam on the left, and the vehicle surface in the blue box on the right is removed as noise. That is, when noise is removed by applying the noise intensity curve of FIG. 5, an object may be considered as noise and removed because of a low intensity value although it is not real noise. Depending on the surface of each object, different reflectance, color, and angle of incidence of the LiDAR beam may cause problems and a specific LiDAR point classified as such noise should be reclassified as important environmental information and maintained.

The present invention takes advantage of the fact that the density of LiDAR points around noise is very low and the density of LiDAR points around normal objects is very high. When the number of neighboring LiDAR points existing within an arbitrary radius of a specific LiDAR point is equal to or greater than a predetermined threshold, it may be maintained as important environmental information rather than noise. FIG. 7A shows neighboring LiDAR points within an arbitrary radius when a specific LiDAR point is noise. FIG. 7B shows neighboring LiDAR points within an arbitrary radius when a specific LiDAR point is an object, that is, when a specific LiDAR point needs to be maintained as important environmental information.

As a result of checking in step S130, if the number of neighboring LiDAR points does not exist above a certain threshold, the specific LiDAR point is determined as noise and removed (S140).

On the other hand, as a result of checking in step S110, when the LiDAR point distance $d_p$ is greater than the noise detection distance $d_s$, all the corresponding points are maintained as environmental information (S160).

And as a result of checking in step S120, if there is no specific LiDAR point in which the intensity measurement value $I_p$ is less than the noise intensity threshold $I_{thr}$, the LiDAR point is maintained as environmental information.

In addition, as a result of checking in step S130, when the number $n_p$ of neighboring LiDAR points within an arbitrary radius of a specific LiDAR point is greater than or equal to a certain threshold value $n_{thr}$, the specific LiDAR point is maintained as environmental information (S150). The specific LiDAR point maintained in step S150 and the LiDAR point maintained in step S160 are integrated and displayed, as shown in FIGS. 8A to 8D.

The LiDAR point cloud noise removal system 10 according to the present invention may be applied to an unmanned robot, an unmanned vehicle, etc. as a mobile body moving on the ground. For example, unmanned robots can be applied to delivery and courier, nuclear power plants in dangerous areas, disaster relief, unmanned cleaning, surveillance and reconnaissance in wartime operational areas, patrols in peacetime garrison, detection of contaminated areas of CBC, and mine detection and removal. Unmanned vehicles can be applied to unmanned tanks, armored vehicles, self-propelled artillery, unmanned material and troop transport vehicles, unmanned ambulances, and unmanned CBRN reconnaissance vehicles.

As another field of application, it may be applied to an air vehicle. The application fields are, for example, exploration and surveillance drones, unmanned logistics delivery drones, air pollution analysis drones, natural resource survey drones, unmanned aerial vehicles for surveillance and reconnaissance, drones and unmanned helicopters for reconnaissance and surveillance, unmanned watercraft for coastal surveillance, etc.

Furthermore, it can be installed in a fixed position and applied to 3D terrain observation, important facility boundary and monitoring fields. Application fields include airport, aviation, oil refinery gas facility, power plant, etc., security and monitoring of major private facilities, security and monitoring of correctional facilities, smart city security and monitoring, GOP/coastal monitoring boundary, wartime garrison boundary, command post and security facility boundary, ammunition storage and supply. Facilities boundaries, three-dimensional analysis and surveying of topography, topographic elevation data (DEM) measurements, coastal/land and watershed boundary surveys, urban modeling and design, and more.

The above detailed description should not be construed as limiting in any respect, but should be considered as illustrative. The scope of the present invention should be determined by rational interpretation of the appended claims, and all changes within the equivalent scope of the present invention are included in the scope of the present invention.

What is claimed is:

1. A method for removing LiDAR point cloud noise, comprising the steps of:
   (a) checking whether a distance of a LiDAR point is within a noise detection distance;
   (b) if the distance of the LiDAR point is within the noise detection distance in step (a), checking whether an intensity measurement value of the LiDAR point is less than a noise intensity threshold;
   (c) if there is a specific LiDAR point whose intensity measurement value is less than the noise intensity threshold in step (b), checking whether a number of neighboring LiDAR points within an arbitrary radius of the specific LiDAR point is greater than or equal to a certain threshold value; and
   (d) if the number of neighboring LiDAR points within the arbitrary radius of the specific LiDAR point is not greater than or equal to the certain threshold value in step (c), determining the specific LiDAR point as noise to be removed,
   wherein the noise intensity threshold is a value obtained through a reflectance and incident angle of noise, and an area ratio between a footprint size of a LiDAR beam and a noise size.

2. A method according to claim 1,
   wherein, if the distance of the LiDAR point is not within the noise detection distance in step (a), maintaining the LiDAR point as environmental information.

3. The method according to claim 1,
   wherein, if the intensity measurement value of the LiDAR point is greater than the noise intensity threshold in step (b), maintaining the LiDAR point as environmental information.

4. The method according to claim 1,
   wherein the noise detection distance is 71.235 m.

5. The method according to claim 1,
   wherein the arbitrary radius is 0.1 m.

6. The method according to claim 1,
   wherein the certain threshold value is 3 pts.

7. The method according to claim 1,
   wherein, in step (c), classifying the specific LiDAR point as noise before checking whether the number of neighboring LiDAR points within the arbitrary radius of the specific LiDAR point is greater than or equal to the certain threshold value.

8. The method of claim 7,
   wherein, in step (d), if the number of neighboring LiDAR points within the arbitrary radius of the specific LiDAR point is greater than or equal to the certain threshold value as the result of the checking in step (c), reclassifying the specific LiDAR point classified as noise before as environmental information.

9. An apparatus for removing LiDAR point cloud noise, comprising:
   at least one processor; and,
   at least one memory storing computer-executable instructions,
   wherein the computer-executable instructions stored in said at least one memory, when executed by the at least one processor, causes the at least one processor to perform operations comprising the steps of:
   (a) checking whether a distance of a LiDAR point is within a noise detection distance;
   (b) if the distance of the LiDAR point is within the noise detection distance in step (a), checking whether an intensity measurement value of the LiDAR point is less than a noise intensity threshold;
   (c) if there is a specific LiDAR point whose intensity measurement value is less than the noise intensity threshold in step (b), checking whether a number of neighboring LiDAR points within an arbitrary radius of the specific LiDAR point is greater than or equal to a certain threshold value; and
   (d) if the number of neighboring LiDAR points within the arbitrary radius of the specific LiDAR point is not greater than or equal to the certain threshold value in step (c), determining the specific LiDAR point as noise to be removed,
   wherein the noise intensity threshold is a value obtained through a reflectance and incident angle of noise, and an area ratio between a footprint size of a LiDAR beam and a noise size.

* * * * *